(12) United States Patent
Lin et al.

(10) Patent No.: US 10,949,065 B2
(45) Date of Patent: Mar. 16, 2021

(54) DESKTOP LAUNCHER

(71) Applicant: Microsoft Technology Licensing, LLC, Redmond, WA (US)

(72) Inventors: Gang Lin, Redmond, WA (US); Jiewei Xu, Redmond, WA (US); Wenfeng Zeng, Redmond, WA (US); Jing Guan, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/469,103

(22) PCT Filed: Jan. 20, 2017

(86) PCT No.: PCT/CN2017/071849
§ 371 (c)(1),
(2) Date: Jun. 12, 2019

(87) PCT Pub. No.: WO2018/133019
PCT Pub. Date: Jul. 26, 2018

(65) Prior Publication Data
US 2020/0081592 A1 Mar. 12, 2020

(51) Int. Cl.
*G06F 3/0483* (2013.01)
*G06F 3/0484* (2013.01)

(52) U.S. Cl.
CPC ........ *G06F 3/0483* (2013.01); *G06F 3/04845* (2013.01)

(58) Field of Classification Search
CPC ................ G06F 3/0483; G06F 3/04845
See application file for complete search history.

(56) References Cited

U.S. PATENT DOCUMENTS

| | | | | |
|---|---|---|---|---|
| 7,904,797 B2 * | 3/2011 | Wong | ................. | G06F 16/40 |
| | | | | 715/200 |
| 8,266,550 B1 * | 9/2012 | Cleron | ................. | G06F 3/04845 |
| | | | | 715/863 |
| 8,291,344 B2 * | 10/2012 | Chaudhri | ............ | G06F 3/04842 |
| | | | | 715/838 |

(Continued)

FOREIGN PATENT DOCUMENTS

| CN | 102364438 A | 2/2012 |
|---|---|---|
| CN | 103067577 A | 4/2013 |

(Continued)

OTHER PUBLICATIONS

Book by Miser: My iPhone, Tenth Edition; pub date: Nov. 2016.*

(Continued)

*Primary Examiner* — Jung-Mu T Chuang
(74) *Attorney, Agent, or Firm* — Schwegman Lundberg & Woessner, P.A.

(57) ABSTRACT

The disclosure relates to a method for interaction. At least one card is presented in a UI of a launcher, each of the at least one card comprises content related items associated with a category of the card. A page is presented in response to a user input indicating switching from presentation of a card to presentation of the page, the page comprises content related items associated with a category of the page, the card is of the same category as the page and comprises a subset of the content related items of the page.

19 Claims, 10 Drawing Sheets

(56) References Cited

U.S. PATENT DOCUMENTS

| | | | | |
|---|---|---|---|---|
| 8,819,734 | B2* | 8/2014 | Moreau | H04N 5/44543 725/44 |
| 8,931,003 | B2* | 1/2015 | Kim | H04N 21/8545 725/44 |
| 8,972,878 | B2* | 3/2015 | Mohler | G06F 21/10 715/765 |
| 9,128,592 | B2* | 9/2015 | Blackburn | G06F 3/0484 |
| 9,395,888 | B2* | 7/2016 | Shiplacoff | G06F 3/0488 |
| 9,635,091 | B1* | 4/2017 | Laukkanen | H04L 67/22 |
| 9,787,631 | B2* | 10/2017 | Zilmer | H04L 51/36 |
| 10,402,382 | B2* | 9/2019 | Robinson | G06F 16/22 |
| 10,521,093 | B1* | 12/2019 | Laukkanen | H04M 1/72583 |
| 2004/0172593 | A1* | 9/2004 | Wong | G06F 16/40 715/201 |
| 2004/0181804 | A1* | 9/2004 | Billmaier | H04N 21/4438 725/39 |
| 2008/0001924 | A1* | 1/2008 | de los Reyes | G06F 3/04886 345/173 |
| 2008/0307335 | A1* | 12/2008 | Chaudhri | G06F 3/0482 715/764 |
| 2011/0072492 | A1* | 3/2011 | Mohler | H04L 67/306 726/3 |
| 2012/0096395 | A1 | 4/2012 | Ording et al. | |
| 2012/0204131 | A1 | 8/2012 | Hoang et al. | |
| 2012/0260218 | A1 | 10/2012 | Bawel | |
| 2013/0305175 | A1* | 11/2013 | Blackburn | H04N 5/4401 715/765 |
| 2013/0325929 | A1* | 12/2013 | Kawabe | H04L 63/08 709/203 |
| 2014/0059496 | A1* | 2/2014 | White | G06Q 10/00 715/841 |
| 2014/0130098 | A1* | 5/2014 | Kim | G06F 3/0346 725/48 |
| 2014/0136328 | A1* | 5/2014 | Abhyanker | G06Q 10/087 705/14.58 |
| 2014/0136977 | A1* | 5/2014 | Arun | G06F 16/40 715/716 |
| 2014/0157191 | A1* | 6/2014 | Shiplacoff | G06F 3/04817 715/788 |
| 2014/0222667 | A1* | 8/2014 | Abhyanker | G06Q 10/10 705/39 |
| 2014/0236723 | A1* | 8/2014 | Abhyanker | G06Q 30/0261 705/14.57 |
| 2014/0258897 | A1* | 9/2014 | Shiplacoff | G06F 3/0486 715/764 |
| 2014/0281936 | A1* | 9/2014 | Wallis | G06F 3/0483 715/251 |
| 2015/0039706 | A1* | 2/2015 | Zilmer | H04L 51/26 709/206 |
| 2016/0077686 | A1* | 3/2016 | Cosio | H04N 21/4821 715/825 |
| 2016/0210018 | A1 | 7/2016 | Singal et al. | |
| 2016/0294916 | A1 | 10/2016 | Daher et al. | |
| 2017/0003875 | A1* | 1/2017 | Sheng | G06F 3/04886 |
| 2017/0017379 | A1* | 1/2017 | Sun | G06F 3/04883 |

FOREIGN PATENT DOCUMENTS

| | | |
|---|---|---|
| CN | 103186320 A | 7/2013 |
| CN | 104077104 A | 10/2014 |
| CN | 104270514 A | 1/2015 |

OTHER PUBLICATIONS

Book by Gookin: Android Phones for Dummies, 3rd Edition; pub date: Aug. 2015.*

Ritchie ("https://www.imore.com/how-use-multitasking-app-switcher-3d-touch-your-iphone-65" by Ritchie; pub date: Sep. 25, 2015).*

"Yahoo Aviate Launcher", https://play.google.com/store/apps/details?id=com.tul.aviate&hl=en, Published on: Dec. 22, 2016, 3 pages.

Jonnalagadda, Harish, "Microsoft's Arrow Launcher has a lot to offer", http://www.androidcentral.com/microsofts-arrow-launcher-astonishingly-good, Published on: Aug. 24, 2016, 34 pages.

"Hangar—Smart app shortcuts", https://play.google.com/store/apps/details?id=ca.mimic.apphangar&hl=en, Published on: Oct. 25, 2016, 3 pages.

Agarwal, Shubham, "ASAP Launcher Brings a Simpler Homescreen to Android", http://techpp.com/2016/07/11/asap-launcher-brings-simpler-homescreen-android/, Published on: Aug. 7, 2016, 7 pages.

"Unlock the top 10 secrets of ZenUI Launcher", https://www.zenui.com/unlock-the-top-10-secrets-of-zenui-launcher/, Published on: Dec. 1, 2015, 14 pages.

"SquareHome 2—Win 10 style", https://play.google.com/store/apps/details?id=com.ss.squarehome2, Published on: Dec. 27, 2016, 4 pages.

Devine, Richard, "Hands on with the Nokia Z Launcher", http://www.androidcentral.com/hands-nokia-z-launcher, Published on: Jun. 19, 2014, 15 pages.

"International Search Report and Written Opinion Issued in PCT Application No. PCT/CN2017/071849", dated Oct. 26, 2017, 11 Pages.

Wang, Zhijun., "Nine Application Skills for Apple | Gens", In Book of Computer Knowledge and Technology, (w/ English Abstract), Aug. 2016, Issue 8, pp. 81-87, (Eight Pages).

"First Office Action and Search Report Issued in Chinese Patent Application No. 201780014339.9", dated Jan. 19, 2021, 15 Pages.

* cited by examiner

DESKTOP LAUNCHER

PRIORITY APPLICATION

This application is a U.S. National Stage Application under 35 U.S.C. 371 from International Application No. PCT/CN2017/071849, filed Jan. 20, 2017, published as WO2018/133019, which is incorporated herein by reference in its entirety.

BACKGROUND

A desktop launcher provides a user interface (UI) for a user as a start point to operate at a computing device. For example, a launcher provides shortcuts to application programs in its UI, so that the user may start the application programs by operating the shortcuts. Examples of a mobile device launcher include open-sourced Android launcher, default launcher from iOS device or Windows Phone (WP) device.

SUMMARY

This Summary is provided to introduce a selection of concepts that are further described below in the Detailed Description. It is not intended to identify key features or essential features of the claimed subject matter, nor is it intended to be used to limit the scope of the claimed subject matter.

Embodiments of the present disclosure may provide an improved launcher. At least one card is presented in a UI of the launcher, each of the at least one card comprises content related items associated with a category of the card. A page is presented in the UI of the launcher in response to receiving a user input which indicates switching from presentation of a card to presentation of the page. The page comprises content related items associated with a category of the page, the card is of the same category as the page and comprises a subset of the content related items of the page.

It should be noted that the above one or more aspects comprise the features hereinafter fully described and particularly pointed out in the claims. The following description and the drawings set forth in detail certain illustrative features of the one or more aspects. These features are only indicative of the various ways in which the principles of various aspects may be employed, and this disclosure is intended to include all such aspects and their equivalents.

BRIEF DESCRIPTION OF THE DRAWINGS

The disclosed aspects will hereinafter be described in connection with the appended drawings that are provided to illustrate and not to limit the disclosed aspects.

DETAILED DESCRIPTION

The present disclosure will now be discussed with reference to several example implementations. It is to be understood that these implementations are discussed only for enabling those skilled in the art to better understand and thus implement the embodiments of the present disclosure, rather than suggesting any limitations on the scope of the present disclosure.

As used herein, the term "includes" and its variants are to be read as open terms that mean "includes, but is not limited to". The term "based on" is to be read as "based at least in part on". The terms "one embodiment" and "an embodiment" are to be read as "at least one implementation". The term "another embodiment" is to be read as "at least one other embodiment". The term "a" or "an" is to be read as "at least one". The terms "first", "second", and the like may refer to different or same objects. The terms "a subset" is to be read as "at least one", for example, a subset of A, B and C is to be read as at least one of A, B and C and include all of A, B and C. Other definitions, explicit and implicit, may be included below. A definition of a term is consistent throughout the description unless the context clearly indicates otherwise.

Figure 1:
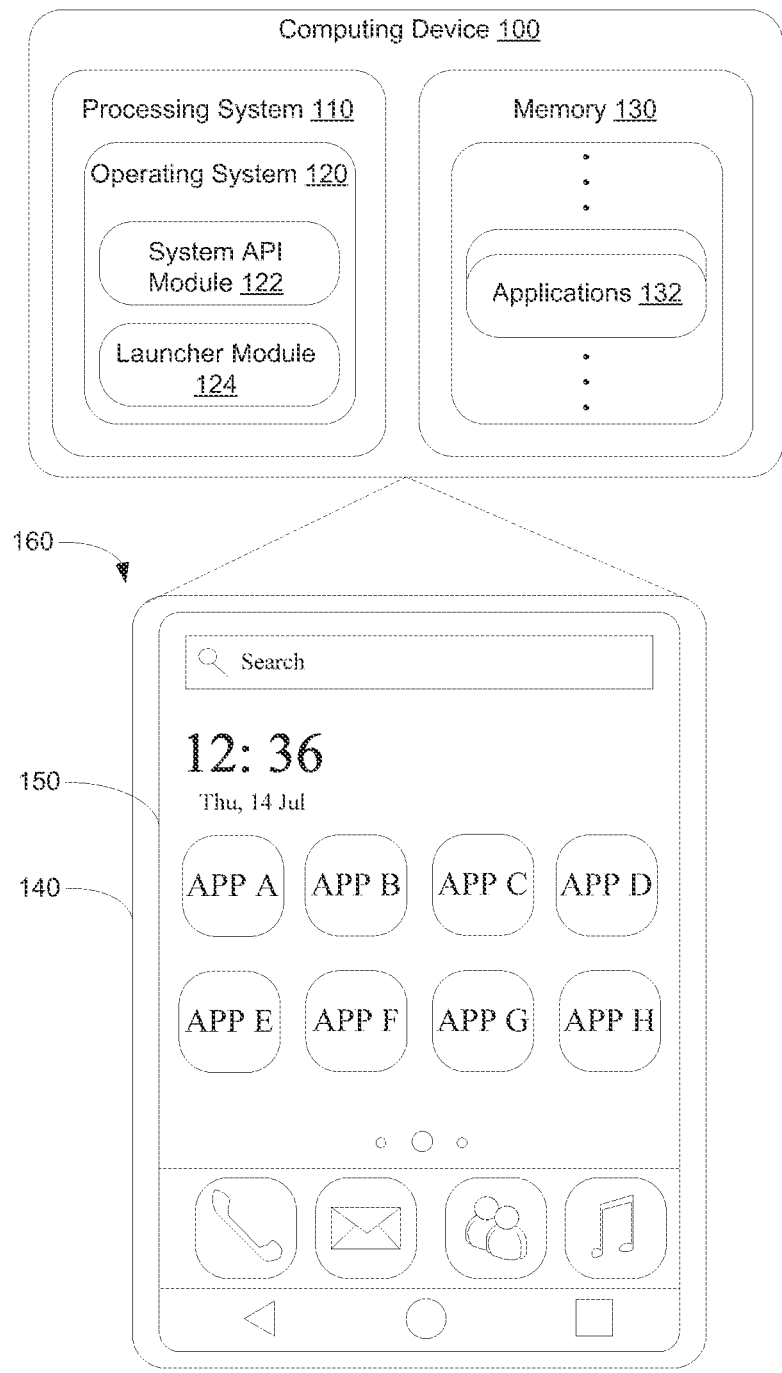
FIG. 1 illustrates an exemplary environment application where the described techniques can be implemented.

FIG. 1 illustrates an exemplary environment where embodiments of the disclosure can be implemented. It is to be appreciated that the structure and functionality of the environment are described only for the purpose of illustration without suggesting any limitations as to the scope of the disclosure. The disclosure can be embodied with a different structure or functionality.

The illustrated environment includes a computing device 100, which is illustrated as a mobile computing device (e.g., a mobile phone) having a housing 104. A variety of other configurations of the computing device 100 are also contemplated. For example, the computing device 100 may be configured as a traditional computer (e.g., a desktop personal computer, laptop computer, and so on), a mobile station, an entertainment appliance, a wireless phone, a tablet, a netbook, and so forth. Thus, the computing device 100 may range from full resource devices with substantial memory and processor resources to a low-resource device with limited memory and/or processing resources. The computing device 100 may also relate to software that causes the computing device 100 to perform one or more operations.

The computing device 100 is also illustrated as including a displayer 150, a processing system 110, and an example of computer-readable storage media, which in this instance is memory 130. The memory 130 is configured to maintain applications 132 that are executable by the processing system 110 to perform one or more operations.

The processing system 110 is not limited by the materials from which it is formed or the processing mechanisms employed therein. For example, the processing system 110 may be comprised of semiconductor(s) and/or transistors (e.g., electronic integrated circuits (ICs)), such as a system on a chip, processors, central processing units, processing cores, functional blocks, and so on. In such a context, executable instructions may be electronically-executable instructions. Alternatively, the mechanisms of the processing system 110, and thus of the computing device 100, may include, but are not limited to, quantum computing, optical computing, mechanical computing (e.g., using nanotechnology), and so forth. Additionally, although a single memory 130 is shown, a wide variety of types and combinations of memory may be employed, such as random access memory (RAM), hard disk memory, removable medium memory, and other types of computer-readable storage media.

The computing device 100 is further illustrated as including an operating system 120. The operating system 120 is configured to abstract underlying functionality of the computing device 100 to applications 132 that are executable on the computing device 100. For example, the operating system 120 may abstract the processing system 110, memory 130, network, input/output, and/or display functionality of the displayer 150, and so on such that the applications 132 may be written without knowing how this underlying functionality is implemented. The application 132, for instance, may provide data to the operating system 120 to be rendered and displayed by the displayer 150 without understanding how this rendering will be performed. The operating system 120 may also represent a variety of other functionality, such as to manage a file system and user interface that is navigable by a user of the computing device 100.

The operating system 120 may be configured to process a variety of different input/output functionality supported by the computing device 100. Thus, the operating system 120 include functionality relating to recognition of inputs and/or provision of outputs by the computing device 100 as well as devices used to detect those inputs. For example, the operating system 120 may be configured to identify gestures and cause operations to be performed that correspond to the gestures, and so on. The inputs may be detected for processing by the operating system 120 in a variety of different ways. For example, the operating system 120 may be configured to receive one or more inputs via touch interaction with a hardware device, e.g., fingers of a user's hand detected using touchscreen functionality of the displayer 150, via a natural user interface (NUI) with an image capturing device (e.g., a camera), via a cursor control device (e.g., a mouse), a remote control (e.g. a television remote control), and so on.

The operating system 120 may also represent a variety of other functionality, such as to manage a file system and a UI that is navigable by a user of the computing device 100. An example of this is illustrated as a launcher module 124 that is representative of functionality to implement a desktop launcher, an example of which is illustrated as a start screen or a home screen which provides a UI, that is, a desktop, for accessing applications or contents represented by the icons. Various configurations are contemplated, such as a desktop or UI that include a single screen on a display area of the displayer or include multiple screens which are switchable on the display area of the displayer. It should be appreciated that the terms launcher, desktop, and UI may be utilized interchangeably in some contexts. And it should be appreciated that although the launcher module 124 is shown as implemented or integrated in the operating system 120, it's also possible to implement a launcher as an application 132, i.e., a launcher application may be executed at the computing device 100 to provide the desktop or UI 160.

The launcher 160, which may also be referred to as the UI 160 of the launcher, includes representations of a plurality of the applications or content 132, such as icon, tiles, textual descriptions, and so on, and may be configured in a variety of ways. The launcher 160, for instance, may be configured as a root level of a hierarchical file structure, e.g., each of the other levels are beneath the root level in the hierarchy. The representations shown in the illustrated example are selectable to launch a corresponding one of applications 132 for execution on the computing device 100. In this way, a user may readily navigate through a file structure and initiate execution of applications 132 of interest. Other configurations are also contemplated, examples of which are discussed in the following and shown in corresponding figures.

The operating system 120 is also illustrated as including a system API module 124 that is configured to provide various system APIs for other modules or applications. Various operations may be implemented by calling the system APIs, examples on the operations include opening an application, opening a picture, a video, a music and so on, receiving various messages, or the like. In one or more implementations, various messages or contents may be obtained by monitoring the related system APIs without executing the corresponding applications 132. This may be used to improve battery life and performance of the computing device 100 by not running each of the applications 132 to output the messages.

Output of the launcher 160 may be initiated in a variety of ways. In the illustrated example, the launcher 160 is initiated once the computing device 100 and the operating system 120 are turned on. In another example, a launcher application 132 may be executed at the computing device 100 to provide the UI of the launcher application 132. In this way, the UI of the launcher application 132 may replace the UI of the launcher integrated in the operating system 120.

It is illustrated that a home screen of the UI of the launcher 160 includes various components such as a search box at the top of the UI, time and date, and icons "APP A" to "APP H" representing respective applications, three small circles, icons of applications denoted by shapes of telephone, envelope, human, and musical note, and operation symbols denoted by a triangle, a circle and a square. It should be appreciated that the icons of applications may be in various forms in addition to the illustrated text "APP A" to "APP H", the graph shapes. The text "APP A" to "APP H" just represents the name of the applications that are installed at the computing device 100, but does not refer to the order of the applications. The three small circles imply that there are three screens currently in the UI of the launcher, the bigger circle in the middle indicates the relative position of the current screen among the three screens. For example, a right swipe operated on the current screen may allow another screen at the left of the current screen in the UI to be displayed on the display area of the displayer 150, and a left swipe operated on the current screen may allow another screen at the right of the current screen in the UI to be displayed on the display area of the displayer 150. It should be appreciated that the UI of the launcher 160 is just an example, various variations are apparent for those skilled in the art.

Figure 2:
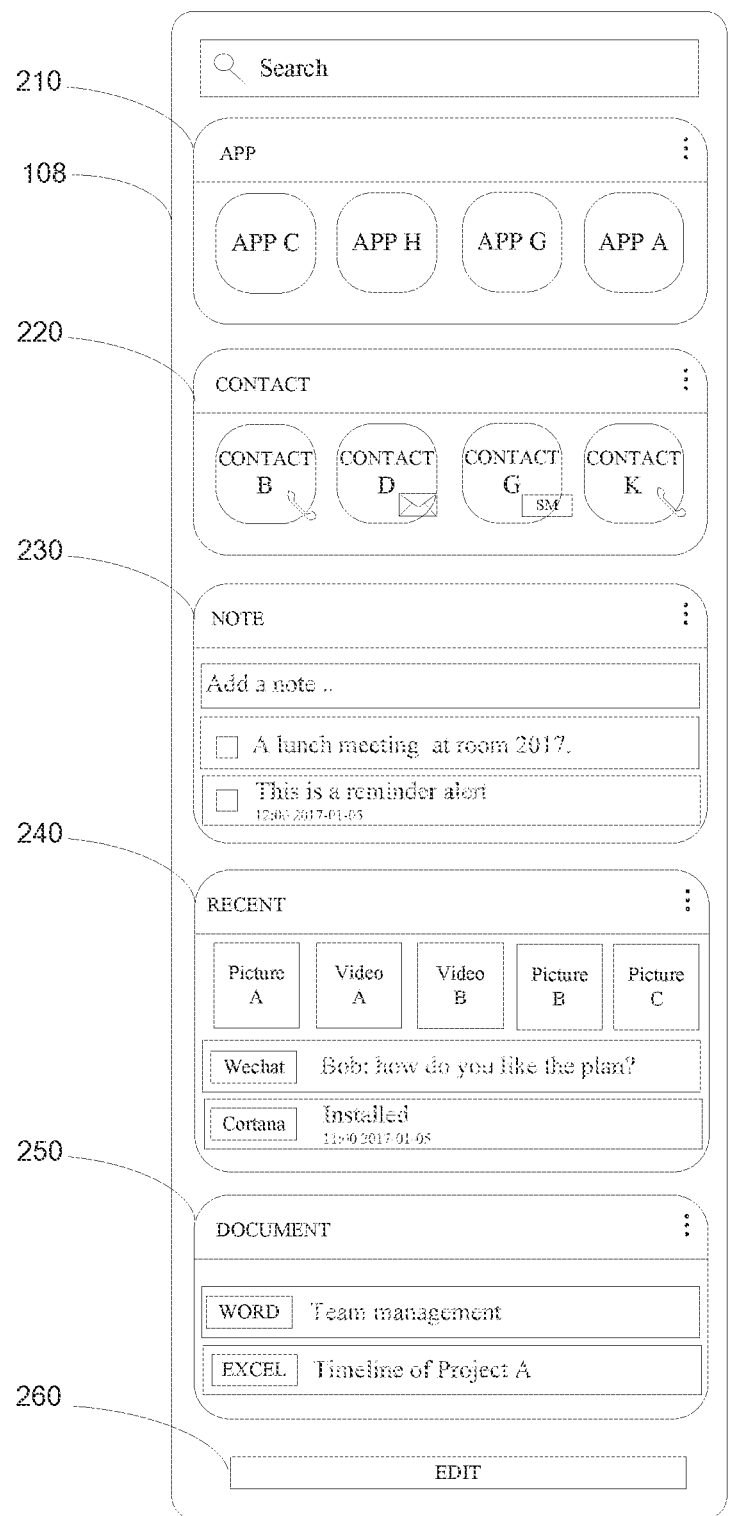
FIGS. 2-7 each illustrates an exemplary part of a UI of a launcher according to an embodiment.

FIG. 2 illustrates an exemplary part of a UI of a launcher according to an embodiment. The same label numbers in different Figures refer to same or corresponding elements.

In an implementation, the screen in FIG. 2 is displayed on the displayer 150 in place of the home screen in FIG. 1 after a right swipe operation is performed on the home screen. Therefore the screen in FIG. 2 may be referred to as minus one screen. It should be appreciated the screen in FIG. 2 is not necessary to be positioned at this position relative to the home screen, and may be at any position among the multiple screens of the UI of the launcher. It is illustrated that the minus one screen appears to be larger than the display area of the displayer 150, and under such circumstance, the minus one screen may be a scrollable screen and be scrollably displayed on the display area of the displayer 150.

It is illustrated that cards 210 to 250 are presented in the UI of the launcher. Each card is of a category such as application 210, contact 220, note 230, recent 240 and document 250. Each card includes contents or content related items associated with the category of the card, in other words, the contents or content related items are collected or grouped in one card according to the category of the card. For example, the content of card 210 relates to applications, the content of card 220 relates to contacts, the content of card 230 relates to notes, the content of card 240 relates to recently occurred content or events at the computing device 100, and the content of card 250 relates to documents. It should be appreciated that there may be various cards and corresponding contents in addition to the illustrated cards in FIG. 2, for example, the contents may also comprise news, music, video, picture, and so on.

The edit button 260 allows a user to edit the cards presented in the minus one screen. For example, the user is allowed to manage the cards, such as deleting some cards and/or adding some cards in the card list by using the edit function. The cards 210-250 will be described with reference to FIGS. 2 to 7.

Figure 3:
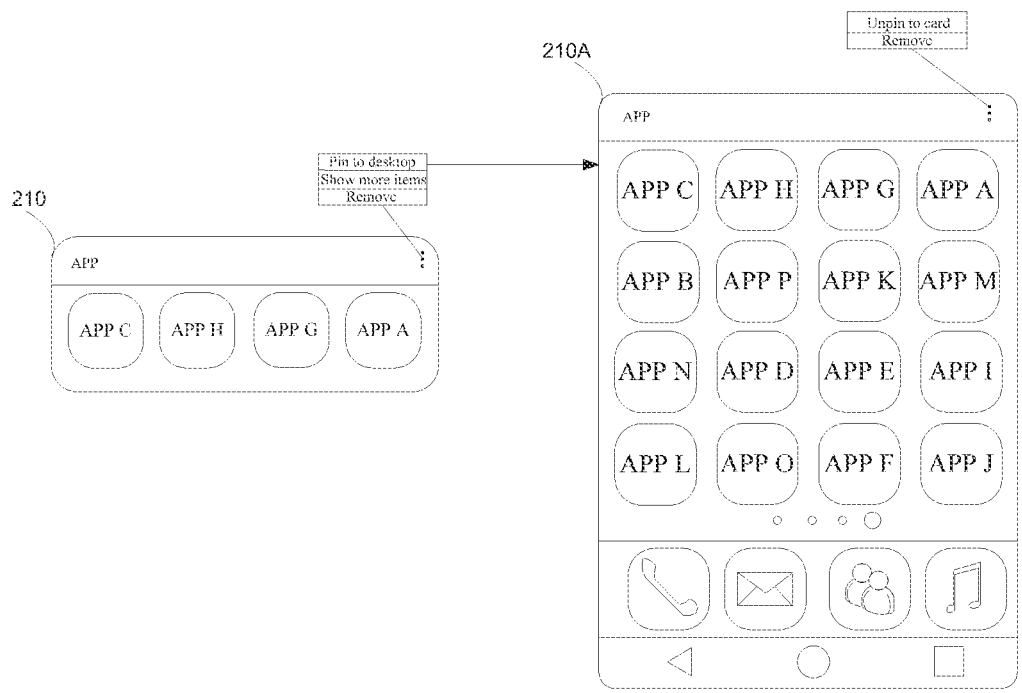

Referring to the card 210 in FIGS. 2 and 3, a menu is presented when the three black dots in the card 210 is operated or tapped by a user. As shown in FIG. 3, the menu includes elements "Pin to desktop", "Show more items" and "Remove". It should be appreciated that more or less elements may be included in the menu.

When the element "Pin to desktop" is operated or selected, a page 210A is presented in the displayer 150. In other words, the presentation of the card 210 is switched to the presentation of the page 210A in the UI of the launcher. As indicated by the bigger circle among the four circles shown in the page 210A, the page 210A occupies a new screen other than the three screens as shown in FIG. 1. The page 210A having the same category of the card 210 may occupy the full screen and may even be a scrollable page, and thus may accommodate much more contents or content related items than the corresponding card 210. It should be appreciated that the shown element "Pin to desktop" is just an example, various manners for switching the presentation of a card to the presentation of a page are applicable. For example, a specific gesture performed to the card on the displayer having a touching screen may be identified as a user input indicating switching the presentation of a card to the presentation of a page.

The "show more items" element in the menu, when operated or chosen, would allow the card 210 to extend larger so as to present more content related items. For example, the content area of the card 210 may extend twofold as large as the original size so as to accommodate a double number of content related items. In the extended card, the "show more items" element would become a "show less items" element, which, when operated or chosen, would allow the extended card to return to its original size. The "show more items" element and "show less items" element may also be referred to as unfolding and folding.

The "remove" element in the menu, when operated or chosen, would cause the card 210 to be removed from the card list of the launcher. In an implementation, when the "remove" element in the card is operated or chosen, both the card 210 and the corresponding page 210A are removed. In this case, as the more convenient card is removed by the user, it is derived that the corresponding page is not desirable for the user and thus may be removed so as to save computing and memory resources.

An "unpin to card" element and a "remove" element are provided in the menu associated with the three black dots in the page 210A. When the "unpin to card" element is operated or chosen, the presentation of the page 210A would be switched to the presentation of the card 210. The "remove" element, when operated or chosen, would cause the page to be removed from the launcher. In an implementation, when the "remove" element in the page is operated or chosen, only the page 210A is removed while the card 210 is remained.

It should be appreciated that more or less elements may be provided in the menu of the card and/or the page. It is not necessary to implement all the elements in the menu as shown in FIG. 3 and in other FIGUREs. The functions of some elements may also be implemented in other ways, for example, the "remove" element or the "unpin to card" element may be implemented by a specific finger gesture performed on the page.

It is illustrated in FIG. 3 that the page 210A includes applications A to P which are presented in an order. The applications may be ordered based on various factors. In an implementation, the applications are ordered based on the operation frequency of the applications. For example, at the current state shown in FIG. 3, the APP C is the most frequently operated application, and thus is presented at the first position among the multiple applications, the APP H follows the APP C based on its operation frequency, and so on.

The operation frequency of an application may be defined in various ways. As an example, the time periods (e.g. 30 minutes) during which a user operates an application may be monitored in a time frame (e.g. a day or an hour or the like), and may be used as the operation frequency. As another example, the times of an application being operated (e.g. opened or activated) by a user may be monitored in a time frame (e.g. a day or an hour or the like), and may be used as the operation frequency. The monitored operation frequency of an application is changed dynamically in the time frame, and therefore the order of the presented applications may be updated dynamically, and thus the most frequently operated applications may be presented to the user at the most convenient positions in the page.

In an implementation, the applications are ordered based on the operation time of the applications. For example, at the current state shown in FIG. 3, the APP C is the most recently operated application, the APP H is the second most recently operated application, and so on. The order of the presented applications may be updated dynamically, and thus the most recently operated applications may be presented to the user at the most convenient positions in the page.

In an implementation, the applications are ordered based on the operation preference, wall time, and/or location. A user's operation preference with regard to some applications may be determined statistically. For example, a user is used to check emails on his commuting time, which usually in between eight to ten o'clock in the morning. Therefore an email application such as OUTLOOK is usually operated at the computing device during this time period in a day. This operation preference of the application may be determined by the launcher based on the pattern in which the application is operated. In this example, the pattern is based on a combination of operation frequency and wall time. Then, a larger weight may be given to this application such as the email application in the deciding of the order of applications during a certain arrange of wall time such as eight to ten o'clock.

As another example, a user usually uses an application such as UBER to call for a taxi when he is at the company late in the night. Therefore the application is usually operated at the computing device late in the night at the location of the user's company. This operation preference of the application may be determined by the launcher based on the pattern in which the application is operated. In this example, the pattern is based on a combination of operation frequency, wall time and location. Then, a larger weight may be given to this application in the deciding of the order of applications during a certain arrange of wall time and at a certain location.

It should be appreciated that the discussed examples are just described for sake of understanding without any intention to limit the disclosure. At least one of operation frequency, operation time, operation preference, wall time, location may be utilized to decide the order of the applications in the page and accordingly in the card.

By ordering the applications in the page 210A of the launcher, the applications that are more likely to be used by a user are presented at the most convenient positions in the page or the screen, i.e., the first several positions in the page, therefore it allows the user to find his desired application and open it faster.

In addition to the open function of an application, the page 210A may provide other functions. For example, the launcher may provide uninstalling function for the applications presented in the page 210A. Therefore the user may uninstall an application by a specific operation to the application in the page 210A.

As another example, the launcher may monitor the status of the applications, and an application which has not been opened for a relative long time (e.g. several weeks or months) may be detected by the launcher. Then the launcher may add a label on the icon of the application in the page to indicate the recommendation of removing this application.

As another example, the launcher may monitor messages related to an application and present the message along with the icon of the application in the page. For example, the launcher may obtain version update information of an application by monitoring the system message center, and indicate this information along with the icon of the application. An example of the indication may be presenting text information aside or under the icon. Another example of the indication may be adding on the icon a label representing availability of update.

As another example, the launcher may present recommended applications in the page 210A. For example, a user likes travel and uses travel related applications or access travel related content or website frequently, the user's hobby of traveling may be obtained by monitoring and analyzing the related data at the computing device or at the cloud, and a travel application may be recommended for the user and presented in the page 210A of the launcher.

As discussed above, the page 210A of the launcher presents applications in an order that enhances the convenience of the user operation, and the page 210A of the launcher provides various functions of the applications to meet the user's needs as much as possible.

On the other hand, the card 210 in the UI of the launcher include a subset of the content or content related items of the page 210A, and the card 210 provides a subset of the functions of the applications provided in the page 210A. It should be appreciated that the term "subset" usually refers to a part, but does not exclude the reference of all in some cases, for example, the page only include a few items that may be accommodated in the card, or an item in a page only provides some function that is also provided in the card. Therefore the term "subset" refers to at least a part, i.e., a part or all.

It is illustrated in FIGS. 2 and 3 that the card 210 includes the first four icons of applications of the page 210A, that is, APP C, APP H, APP G, APP A. That is to say, the card 210 presents a number of applications that are most likely to be operated by the user in a compact way.

In an implementation, the items in the card only provide the open function of the applications, i.e., the user is only allowed to open an application by operating the icon of the application in the card. In this way, the card 210 provides the most usable content or content related items of the page 210A and provides the most usable functions of the items of the page 210A. From an implementing perspective, the page of the launcher is a standard container to contain a set of items and functions and the card of the launcher is a compact container to contain a subset of the set of items and functions. This allows the user to complete habitual operations quickly and conveniently in the card, and allows the user to transfer from the card to the page of the launcher when the user's need cannot be met in the card.

Figure 4:
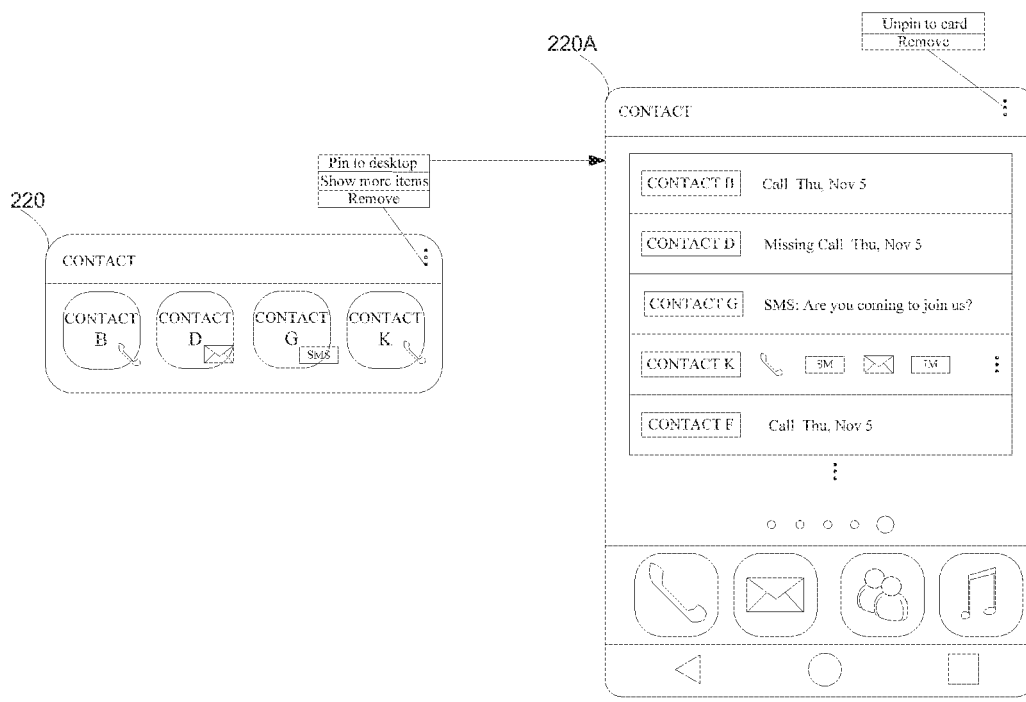

Referring to the card 220 in FIGS. 2 and 4, when the element "Pin to desktop" in the card 220 is operated or chosen, a page 220A may be presented in the displayer 150. In other words, the presentation of the card 220 is switched to the presentation of the page 220A in the UI of the launcher. As indicated by the bigger circle among the five circles shown in the page 220A, the page 220A occupies a new screen other than the three screens as shown in FIG. 1 or the four screens as shown in FIG. 3. The page 220A having the same category of the card 220 may occupy the full screen and usually be a scrollable page in order to accommodate a plurality of content related items, i.e., the contact items.

It is illustrated in FIG. 4 that the page 220A includes items related to contacts which are presented in an order. The contacts may be ordered based on various factors. In an implementation, the contacts are ordered based on the operation frequency of the contacts. For example, at the current state shown in FIG. 4, the CONTACT B is the most frequently operated contact, and thus is presented at the first position among the multiple contacts, the CONTACT D follows the CONTACT B based on its operation frequency, and so on. It is appreciated that the CONTACT B, CONTACT D and so on refer to the name of the contacts, and may also be presented along with images of the contacts if available.

The operation frequency of a contact may be defined in various ways. As an example, the time periods (e.g. 20 minutes) during which a user is communicating with a contact may be monitored in a time frame (e.g. a day), and may be used as the operation frequency. As another example, the times of a contact being operated (e.g. a dial, a short message (SM), an instant message (IM) or an email is performed) by a user may be monitored in a time frame (e.g. a day), and may be used as the operation frequency. The monitored operation frequency of a contact is changed dynamically in the time frame, and therefore the order of the presented contacts may be updated dynamically, and thus the most frequently operated contacts may be presented to the user at the most convenient positions in the page.

In an implementation, the contacts are ordered based on the operation time of the contacts. For example, at the current state shown in FIG. 4, the CONTACT B is the most recently operated contact, the CONTACT D is the second most recently operated contact, and so on. It should be appreciated that the operation of a contact not only refers to the user's operation of the contact, but also refers to an incoming operation of the contact, such as an incoming call (no matter missed or picked), SM, IM, email or the like. The order of the presented contacts may be updated dynamically, and thus the most recently operated contacts may be presented to the user at the most convenient positions in the page.

In an implementation, the contacts are ordered based on the operation preference, wall time, and/or location. A user's operation preference with regard to some contact may be determined statistically. For example, a user is used to make a telephone call to his wife in almost every afternoon, usually in between fifteen to seventeen o'clock. Therefore the contact item related to his wife is usually operated at the computing device during this time period in a day. This operation preference of the contact may be determined by the launcher based on the pattern in which the contact is operated. In this example, the pattern is based on a combination of operation frequency and wall time. Then, a larger weight may be given to this contact in the deciding of the order of contacts during a certain arrange of wall time such as fifteen to seventeen o'clock.

As another example, a user usually calls his mother when he is at the company late in the night. Therefore the contact item related to his mother is usually operated at the computing device late in the night at the location of the user's company. This operation preference of the contact may be determined by the launcher based on the pattern in which the contact is operated. In this example, the pattern is based on a combination of operation frequency, wall time and location. Then, a larger weight may be given to this contact in the deciding of the order of contacts during a certain arrange of wall time and at a certain location.

It should be appreciated that the discussed examples are just described for sake of understanding without any intention to limit the disclosure. At least one of operation frequency, operation time, operation preference, wall time, location may be utilized to decide the order of the contacts in the page and accordingly in the card.

By ordering the contacts in the page 220A of the launcher, the contacts that are more likely to be used by a user are presented at the most convenient positions in the page or the screen or the display area, i.e., the first several positions in the page, therefore it allows the user to find his desired contact and operate it faster.

As shown in the page 220A, the contact related items may provide multiple functions. For example, as shown in CONTACT B, the operation of a call and the time of the call are presented in this item. As shown in CONTACT D, the missing of a call and the time of the call are presented in this item. As shown in CONTACT G, the incoming short message is presented in the item. As shown in CONTACT K, the available operable functions such as dial, SM, email, IM, are presented in the item.

Referring to the CONTACT K in the page 220A, the available functions such as dial, SM, email, IM, are presented in the item of CONTACT K after for example the user taps on this item when a user is going to communicate with contact K. Then the user is allowed to choose one of the communicating functions provided by the contact item to perform the communication. It should be appreciated that the specific functions such as dial, SM, email, IM are just for illustration but not for limitation to the disclosure.

As discussed above, the page 220A of the launcher presents contacts in an order that enhances the convenience of the user operation, and the page 220A of the launcher provides various functions of the contacts to meet the user's needs as much as possible. Moreover, as the contact items and the related functions are implemented in the page 220A of the launcher, a specific application of contacts or address book is usually not needed to be launched at the computing devices. In this way, the time for launching such an application is saved for the user, and the time for locating a desired contact is also shortened for the user in most cases.

On the other hand, the card 220 in the UI of the launcher include a subset of the content or content related items of the page 220A, and the card 220 provides a subset of the functions of the contacts provided in the page 220A.

It is illustrated in FIGS. 2 and 4 that the card 220 includes the first four contacts of the page 220A, that is, CONTACT B, CONTACT D, CONTACT G, CONTACT K. That is to say, the card 220 presents a number of contacts that are most likely to be operated by the user in a compact way.

In an implementation, each contact item in the card 220 only provide the one of the functions that is provided by the corresponding item of the page 220A. As shown in the card 220, the item of CONTACT B provides a dial function, the item of CONTACT D provides an email function, the item of CONTACT G provides a SM function, the item of CONTACT K provides a dial function. When the user operates the icon of CONTACT B in the card, the dial operation is directly performed in response to the user's operation, and similarly when the user operates the icon of CONTACT G in the card, the SM operation is directly performed in response to the user's operation.

The subset of functions provided in the card 220 may be determined out of the functions provided in the page 220A based on various factors. In an implementation, the subset of functions of a content related item is determined based on the operation frequency of the functions of the item. For example, at the current state shown in FIG. 4, the dial function is the most frequently operated function for the CONTACT B, and thus the item of CONTACT B provides the dial function in the card, the email function is the most frequently operated function for the CONTACT D, and thus the item of CONTACT D provides the email function in the card, the SM function is the most frequently operated function for the CONTACT G, and thus the item of CONTACT G provides the SM function in the card, the dial function is the most frequently operated function for the CONTACT K, and thus the item of CONTACT K provides the dial function in the card.

The operation frequency of a function of a contact may be defined in various ways. As an example, the time periods (e.g. 20 minutes) during which a user is communicating with the contact by way of a function may be monitored in a time frame (e.g. a day), and may be used as the operation frequency of this function. As another example, the times of a function of a contact being operated by a user may be monitored in a time frame (e.g. a day), and may be used as the operation frequency of this function. The monitored operation frequency of a function of a contact is changed dynamically in the time frame, and therefore the function provided with the contact in the card 220 may be updated dynamically, and thus the most frequently operated function may be provided along with the contact item in the card.

In an implementation, the subset of functions of a content related item is determined based on the operation time of the functions of the item. For example, at the current state shown in FIG. 4, the most recent function operated to CONTACT B is dial, and thus the item of CONTACT B provides the dial function in the card, the most recent function operated to CONTACT D is mail, and thus the item of CONTACT D provides the email function in the card, the most recent function operated to CONTACT G is SM, and thus the item of CONTACT G provides the SM function in the card, the most recent function operated to CONTACT K is dial, and thus the item of CONTACT K provides the dial function in the card.

In an implementation, the subset of functions provided in the card 220 may be determined based on the operation preference, wall time, and/or location. A user's operation preference with regard to some function of a contact may be determined statistically. For example, a user is used to make a telephone call to his wife in almost every afternoon, usually in between fifteen to seventeen o'clock. Therefore the dial function of the contact item related to his wife is usually operated at the computing device during this time period in a day. This operation preference of the function of the contact may be determined by the launcher based on the pattern in which the contact is operated. In this example, the pattern is based on a combination of operation frequency and wall time. Then, a larger weight may be given to the dial function of the contact in the deciding of the subset of functions of the contact during a certain arrange of wall time such as fifteen to seventeen o'clock.

As another example, a user usually sends a short message to his mother when he is at the company late in the night. Therefore the SM function of the contact item related to his mother is usually operated at the computing device late in the night at the location of the user's company. This operation preference of the contact may be determined by the launcher based on the pattern in which the contact is operated. In this example, the pattern is based on a combination of operation frequency, wall time and location. Then, a larger weight may be given to the SM function of the contact in the deciding of the subset of functions of the contact during a certain arrange of wall time and at a certain location.

In this way, the card 220 provides the most usable content or content related items of the page 220A and provides the most possibly usable subset of functions of the items of the page 220A. This allows the user to complete habitual operations quickly and conveniently in the card, and allows the user to transfer from the card to the page of the launcher when the user's need cannot be met in the card.

Figure 5:
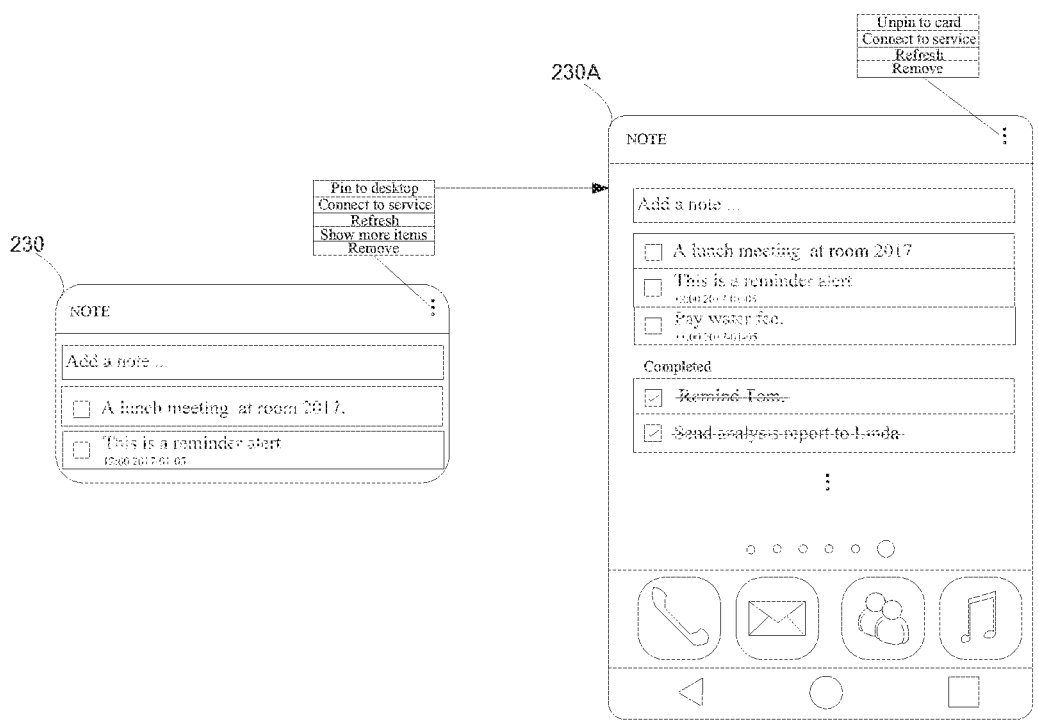

Referring to the card 230 in FIGS. 2 and 5, the menu associated with the three block dots in the card 230 includes elements "Pin to desktop", "Connect to service", "Refresh", "Show more items" and "Remove". When the element "Pin to desktop" in the card 230 is operated or chosen, a page 230A may be presented in the displayer 150. In other words, the presentation of the card 230 is switched to the presentation of the page 230A in the UI of the launcher. As indicated by the bigger circle among the six circles shown in the page 230A, the page 230A occupies a new screen other than the three screens as shown in FIG. 1 or the five screens as shown in FIG. 4. The page 230A having the same category of the card 230 may occupy the full screen and usually be a scrollable page in order to accommodate a plurality of content related items, i.e., the note related items.

It is illustrated in FIG. 5 that the page 230A includes items related to notes or notifications. A note related item may be a dialog box for a user to input a note or any content. The dialog box may prompt "add a note . . . " as shown in the page 230A. The dialog box may receive various format of input content, such as text input, speech input. In an implementation, after receiving a note via the dialog box from a user, the note is added to the to-do-list as shown below the dialog box.

A noted related item may be an item in the to-do-list, and the items in the to-do-list are usually ordered in an order of time. It should be appreciated that any other order manners would be applicable for the items in the to-do-list. For example, the user is allowed to set a note to be always on the top of the to-do-list.

The user is allowed to operate the items in the to-do-list in the page 230A of the launcher, for example, an item in the to-do-list may be marked as a completed one, or may be set to another time limit. When the user input indicating completion of a note is received in the page, for example, the square is chosen by the user, this note item may be moved to a Completed list in the page 230A. It should be appreciated that the functions related to the note page is not limited to those illustrated, various other functions such as setting a reminder or recording content like a diary may be applicable in the page 230A of the launcher.

The note functions are implemented in the page 230A of the launcher. In an implementation, if a software develop kit (SDK) of a note service is available, the note functions may be implemented or integrated in the page of the launcher by utilizing the SDK. For example, WUNDERLIST is a note service, and the SDK of the WUNDERLIST may be utilized to implement some functions of the WUNDERLIST in the page of the launcher so as to provide the user services from the WUNDERLIST server. By providing the note functions in the page 230A of the launcher, the user may access the functions much quicker than the conventional user experience of finding a note application such as WUNDERLIST and waiting for its launching.

Additionally or alternatively, in another implementation, notifications related to installed applications such as OUT-LOOK, CALENDAR may be presented in the note page 230A of launcher. Such notifications may be obtained by monitoring the related system APIs without opening the corresponding applications. Then the user is allowed to view the notifications or reminders from various applications conveniently in the page 230A or in the corresponding card 230 without needing to open the applications. Therefore the times to find the application and waiting for the application to open is saved for the user, and the computing resources for running the application is saved.

On the other hand, the card 230 in the UI of the launcher include a subset of the content or content related items of the page 230A, for example, the card 230 present fewer number of items in the to-do-list or note-list, and even does not present the Completed list as this list is less important. The content related items in the card 230 usually provide similar functions for sake of the user to complete operations conveniently in the card, and it should be appreciated that the card 230 may provide a subset of the functions of the items provided in the page 230A.

Referring back to the menus associated with the three black dots in the card 230 and the page 230A, the "connect to service" element allows the user to manually connect to the service or server such as the WUNDERLIST service as discussed above. When the connection to service is established, the "connect to service" element may become "disconnect from service" element. The "refresh" element allows the user to manually update the data presented in the note card and the note page through exchanging data with the service or server.

Figure 6:
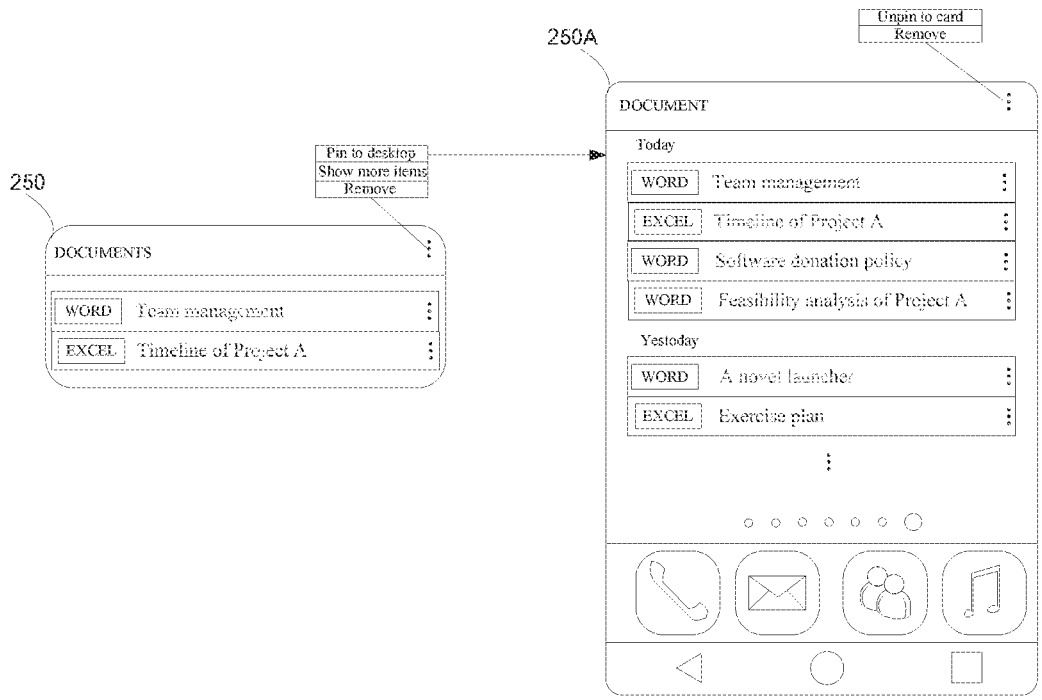

Referring to the card 250 in FIGS. 2 and 6, when the element "Pin to desktop" in the card 250 is operated or chosen, a page 250A may be presented in the displayer 150. In other words, the presentation of the card 250 is switched to the presentation of the page 250A in the UI of the launcher. As indicated by the bigger circle among the seven circles shown in the page 250A, the page 250A occupies a new screen other than the three screens as shown in FIG. 1 or the six screens as shown in FIG. 5. The page 250A having the same category of the card 250 may occupy the full screen and may be a scrollable page in order to accommodate a plurality of content related items, i.e., the document items.

It is illustrated in FIG. 6 that the page 250A includes items related to documents. The documents are usually ordered in the page based on the last time at which the documents were operated.

In an implementation, document processing tools may be implemented or incorporated in the launcher. When a document item such as the "Team management" is operated or tapped, the document may be opened in a new page of the launcher, and then reviewing or editing may be performed in the new page of the launcher. In another implementation, the document may be opened by an application installed in the computing device.

The element indicated by the three black dots in an item provides more functions that may be operated to the document. For example, when the element of the three black dots is operated or tapped, functions such as sharing the document, deleting the document, renaming the document and so on may be presented. The sharing of the document may be in any ways, for example, sharing through email, IM tools, social network, network disk, and so on.

On the other hand, the card 250 in the UI of the launcher include a subset of the content or content related items of the page 250A, for example, the card 250 presents fewer number of document items. The content related items in the card 250 may provide similar functions for sake of the user to complete operations conveniently in the card, and it should be appreciated that the card 250 may provide a subset of the functions of the items provided in the page 250A.

Figure 7:
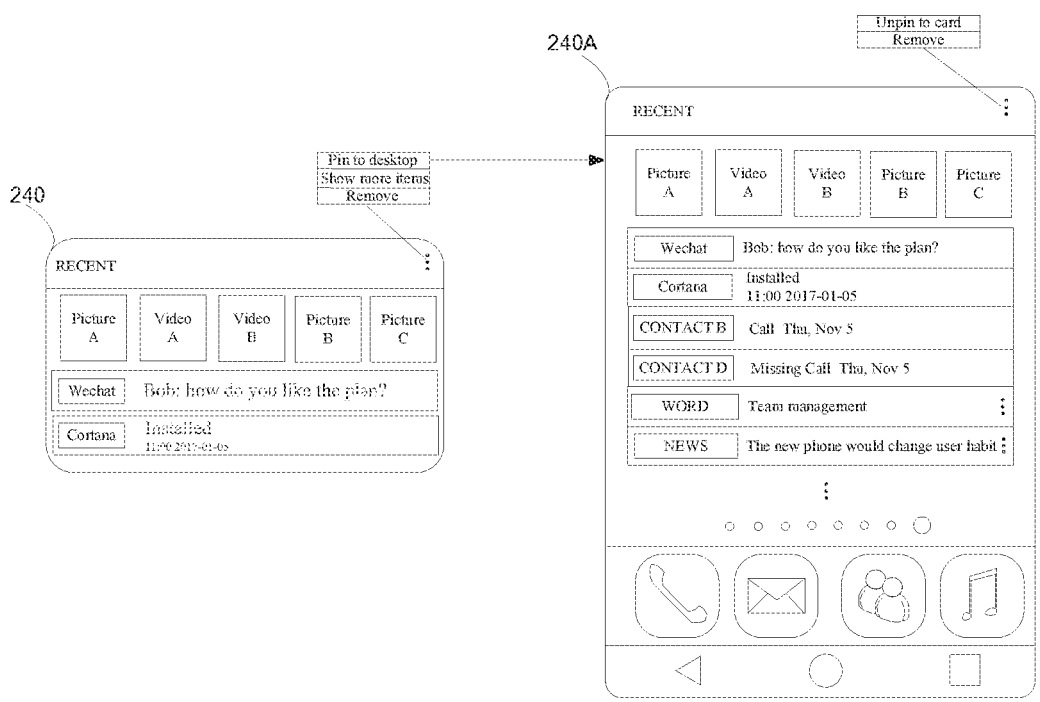

Referring to the card 240 in FIGS. 2 and 7, when the element "Pin to desktop" in the card is operated or selected, a page 240A may be presented in the displayer 150. In other words, the presentation of the card 240 is switched to the presentation of the page 240A in the UI of the launcher. As indicated by the bigger circle among the eight circles shown in FIG. 7, the page 240A occupies a new screen other than the three screens as shown in FIG. 1 or the seven screens as shown in FIG. 6. The page 240A having the same category of the card 240 may occupy the full screen and usually be a scrollable page in order to accommodate a plurality of content-related items, i.e., recent occurred content.

Differently from the above mentioned cards and pages, the card 240 and the page 240A being of a category of the recent include multiple categories or kinds of content which are occurred recently. In other words, the recent category comprises content related items that are of two or more of the above mentioned categories and other possible categories, and the content related items included in the recent category are usually ordered based on the occurrence time of the items.

It is illustrated in FIG. 7 that picture A, video A, video B, picture B and picture C are presented in the page 240A in the order of their occurrence time. In other words, the picture A is the most recently operated one among them, the video A is the secondly most recently operated one among them, and so on. The launcher may detect the operations to the pictures and/or videos by monitoring related system APIs, and accordingly present the recently operated pictures and/or videos in the recent cards. In addition, various operation functions may be provided for the pictures and/or videos in the page 240A, for example, the functions for viewing, editing, sharing to contact or social media, and so on may be provided for the pictures and/or videos in the page 240A.

In addition to the pictures and videos, it is illustrated in FIG. 7 that the page 240A includes other categories of content related items. There presented in the page 240A a message related to an IM application named Wechat, an application named Cortana that was recently installed, recently operated CONTACT B and CONTACT D, a recently operated document, a received news, and so on. The content related items are presented in the page 240A in an order of their occurrence time. The occurrence of the items may be detected by the launcher by monitoring the related system APIs.

It should be appreciated that more or less categories of items may be monitored and presented in the recent page 240A. In an implementation, the user is allowed to set the categories that are included in the recent card. It should be appreciated that various operation functions, e.g. those discussed above, may be provided for the items in the recent page 240A. For example, the news item as shown in the page 240 may provide functions such as adding a label of a news, commenting on a news, rating on a news, and collecting to favorite, sharing a news, and so on.

The recent card 240 includes a subset of the content related items of the page 240A. The subset of content related items are presented in an order of occurrence time in the recent card 240. And the items in the card 240 may also provide a subset of functions that are provided by the corresponding items of the page 240A.

Exemplary cards and pages presented in the UI of the launcher have been discussed with reference to FIGS. 2-7. The pages provide contents and functions that are to be used by a user, therefore the pages in the launcher intend to satisfy user requirements as much as possible even without needing corresponding applications to be installed or opened. The cards provide important subsets of the contents and functions of the pages, and are grouped in a specific screen such as the minus one screen in the UI of the launcher. In this way, the user is allowed to achieve a large amount of tasks through the group of cards in a single screen, this would be very convenient for the user. When a card cannot meet the requirement of the user, it would be able to switch to the page quickly. Therefore, by providing the set of contents and functions in the page and providing the subset of contents and functions in the card, the disclosure provides a convenient way to operate on a computing device.

Figure 8:
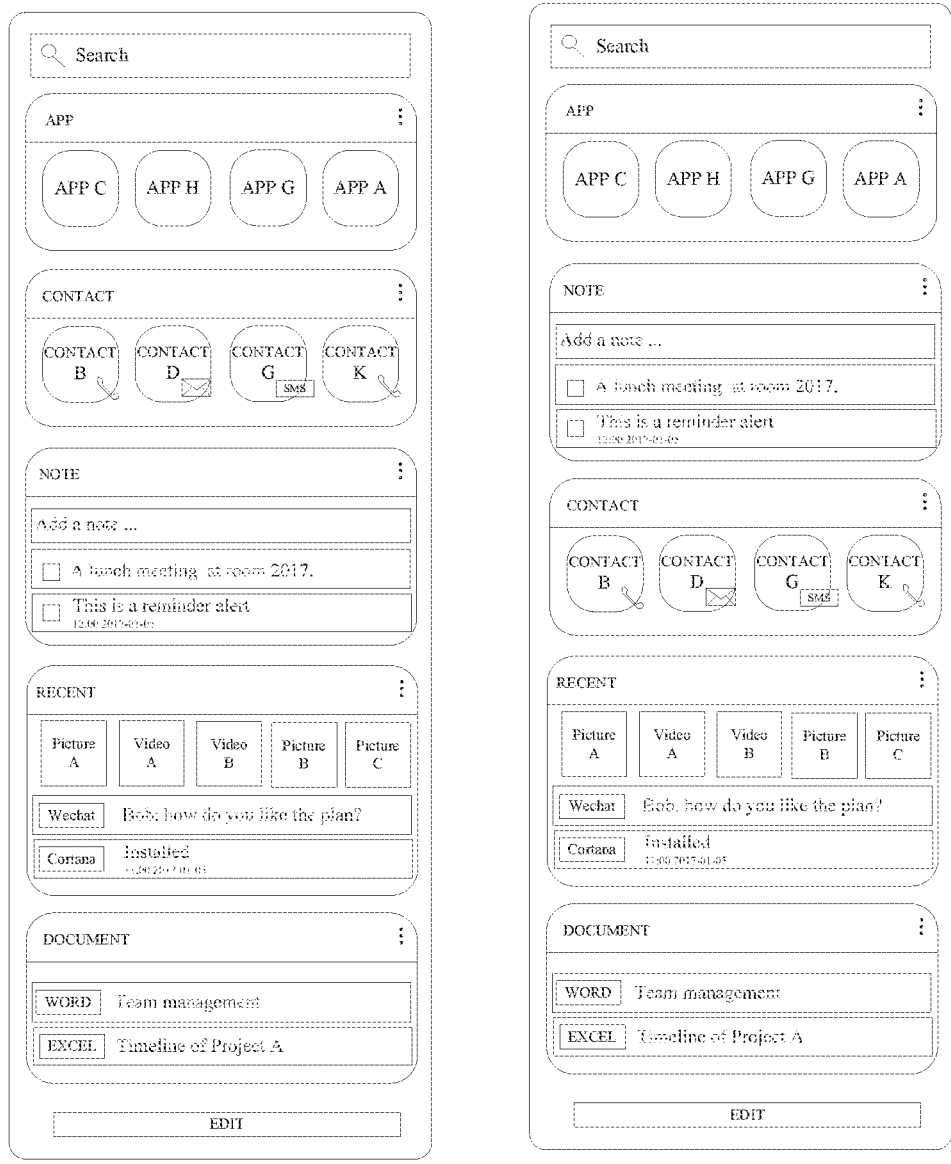
FIGS. 8-9 each illustrates an exemplary operation of a group of cards according to an embodiment.

FIG. 8 illustrates the operation of a group of cards according to an embodiment. In an implementation, the order of the cards may be changed in the screen in response to a user input or a user operation. For example, when a card such as the note card is continuously pressed for a predetermined time length, the card may be in a movable state and may be moved to a position among the group of cards. As shown in FIG. 8, the note card, which is more likely to be operated by a user, may be moved to the more convenient position which is between the APP card and the CONTACT card. The pressing and/or other operating on the card may be performed by using a hard ware such as the user's finger, a cursor positioning device, a touching pen, and may be performed through a NUI.

Figure 9:
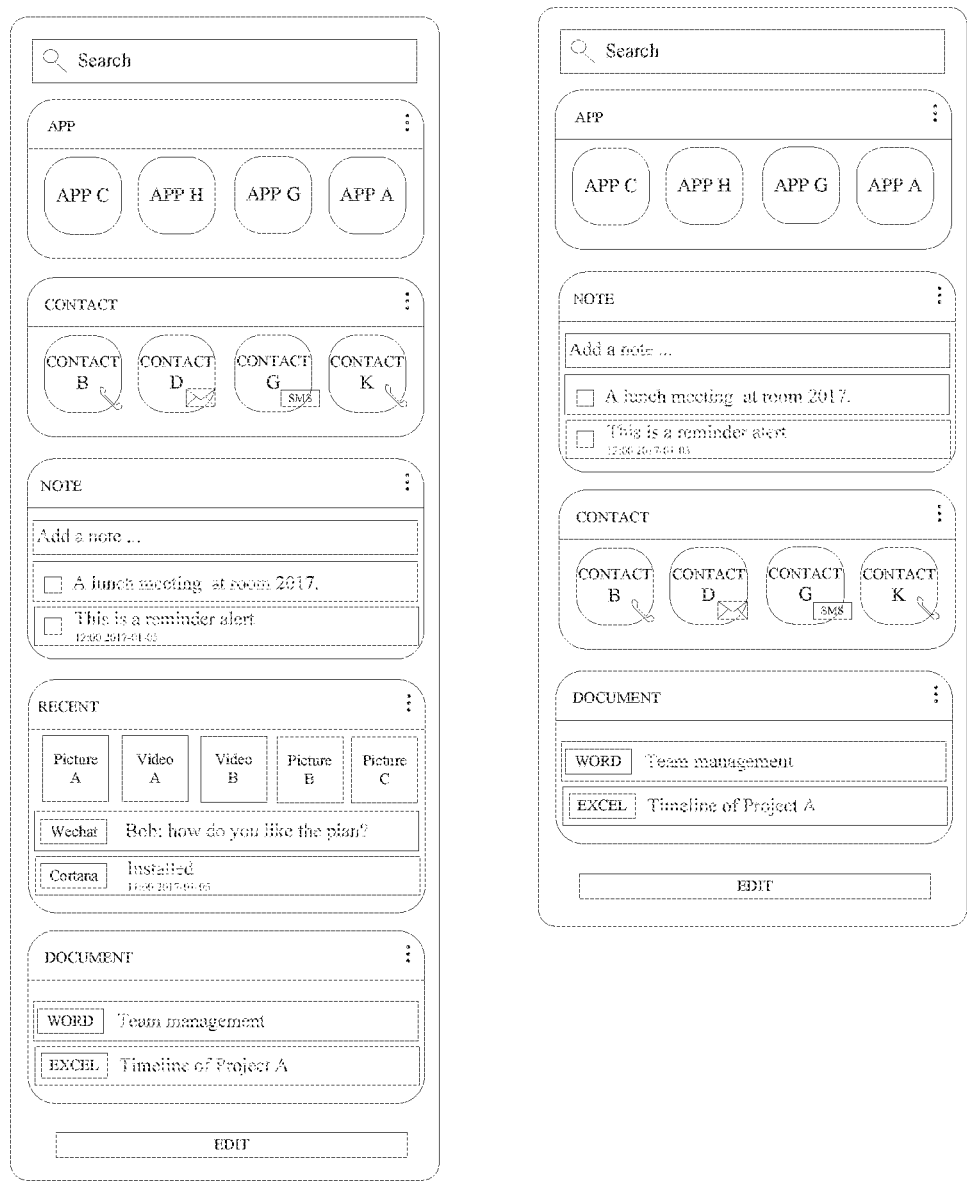

FIG. 9 illustrates the operation of a group of cards according to an embodiment. In an implementation, a card may be removed or demolished from the screen in response to a user input or a user operation. For example, when a card such as the RECENT card is continuously pressed for a predetermined time length, the card may be in a movable state, in which a certain gesture, such as a swipe to the left, performed on the card may be used to remove the card. Alternatively, as discussed above, the card may also be removed by choosing the remove button in the menu of the card. In an implementation, in response to the removing operation to a card, both the card and the corresponding page are removed from the UI of the launcher.

Figure 10:
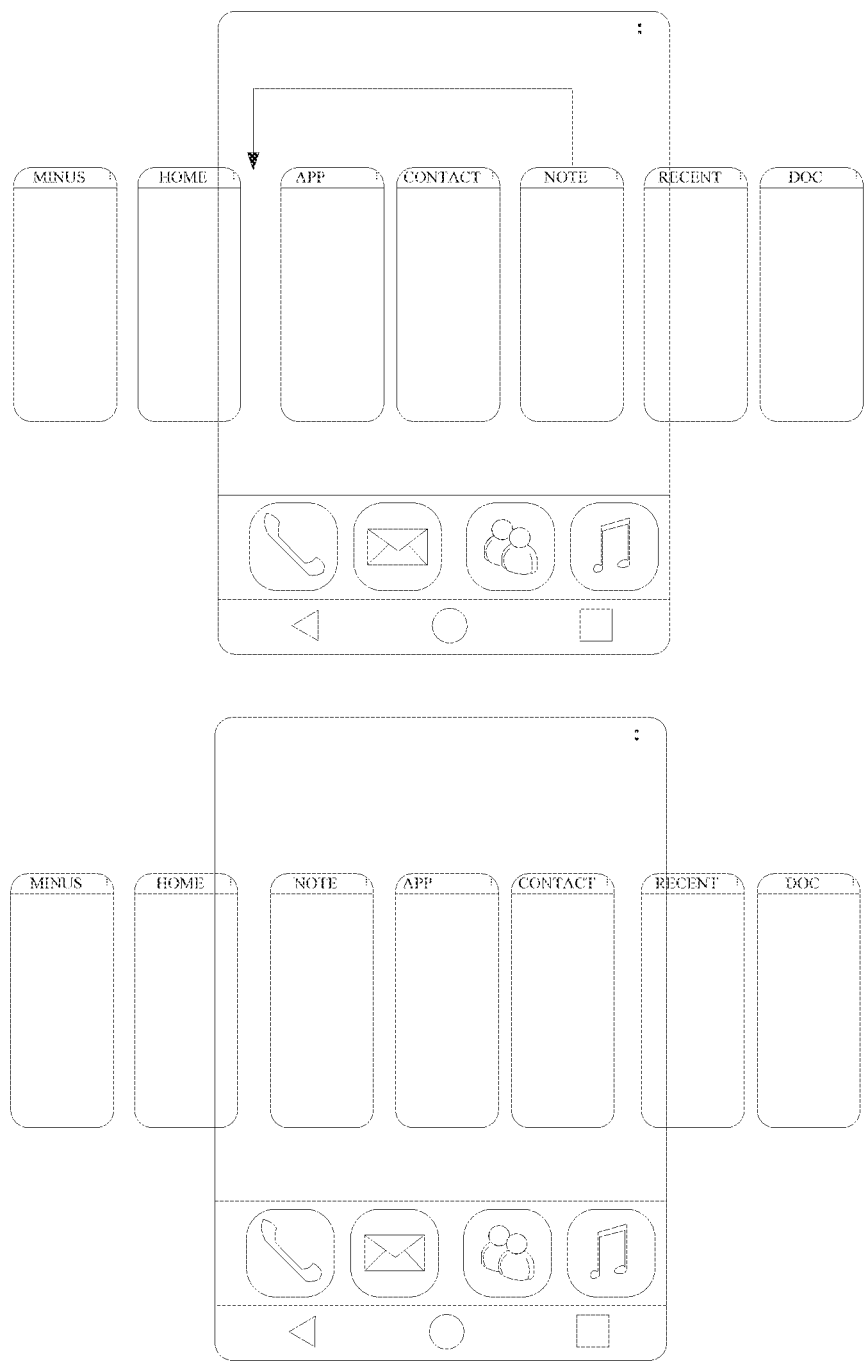
FIGS. 10-11 each illustrates an exemplary operation of a group of pages according to an embodiment.

FIG. 10 illustrates the operation of a group of pages or screens according to an embodiment. In an implementation, the order of the pages may be changed in response to a user input or a user operation. A page movable state as shown in FIG. 10 may be entered by a certain user input or user operation, such as a long pressing of a page or a long pressing of the home key as shown by the little circle in the bottom of the computing device. It should be appreciated that FIG. 10 schematically shows the order of the movable screens or pages, which may be presented in the displayer in a slidable manner. A page may be moved to a position among the group of pages or screens in the page movable state. As shown in FIG. 10, the NOTE page may be moved to the position before the APP page. Then the user may quickly switch among the minus one screen, the home screen, and the NOTE page by least operations such as swipe operations to the screens in the UI of the launcher.

Figure 11:
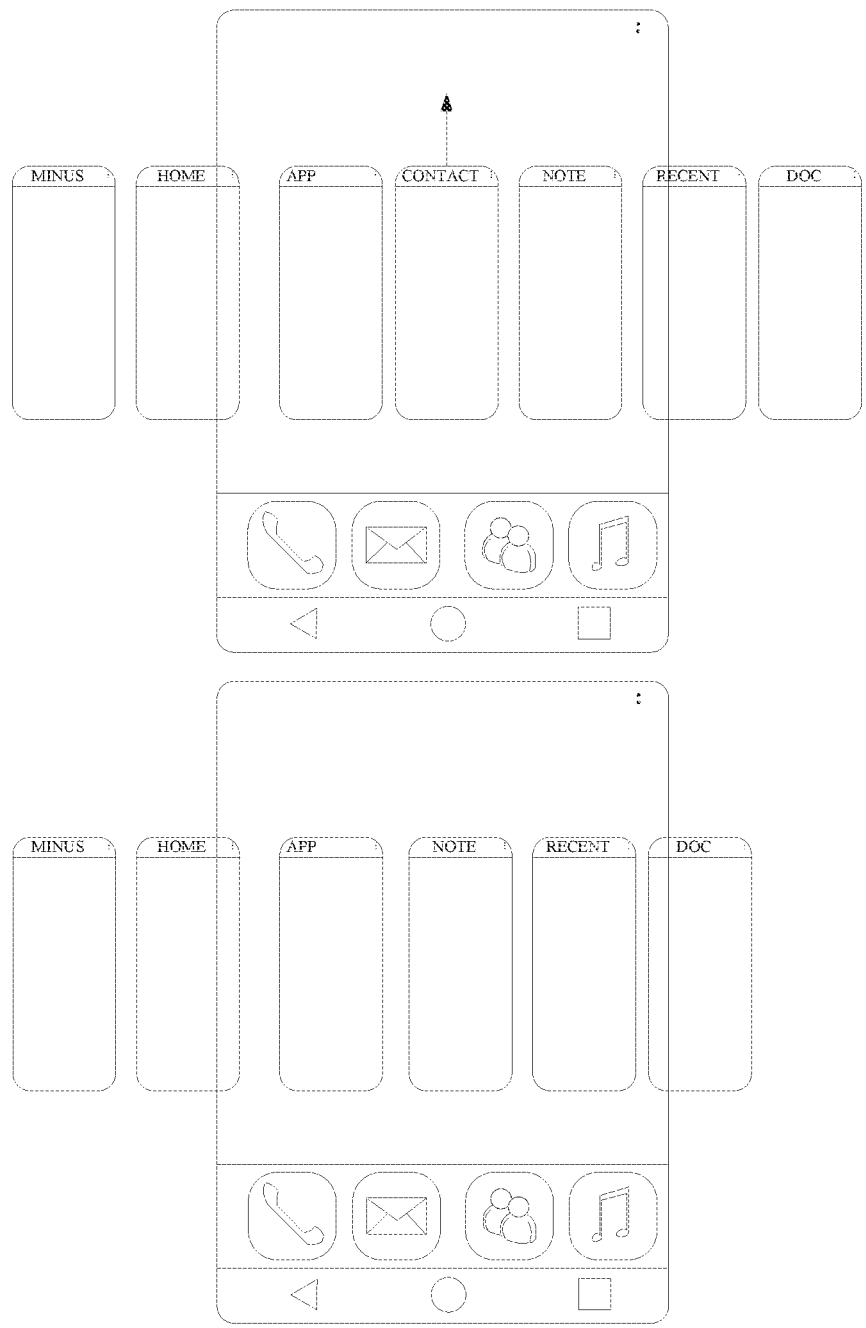

FIG. 11 illustrates the operation of a group of pages or screens according to an embodiment. In an implementation, a page may be removed or demolished from among the pages in response to a user input or a user operation. For example, a page such as the CONTACT page may be removed in the page movable state in response to a certain gesture, such as a swipe to the up, performed on the page. Alternatively, as discussed above, the page may also be removed by choosing the remove button in the menu of the page.

Figure 12:
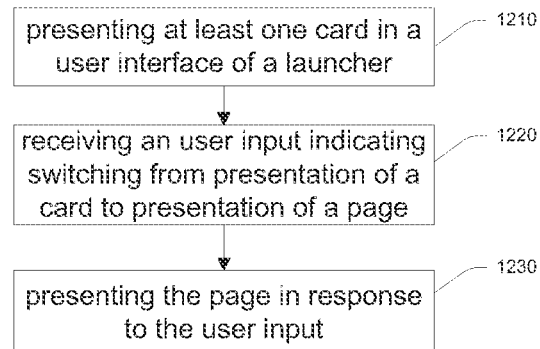
FIG. 12 is a flowchart of an exemplary method for interaction according to an embodiment.

FIG. 12 illustrates a method for presenting contents according to an embodiment of the disclosure. At step 1210, at least one card is presented in a UI of a launcher. Each of the at least one card comprises content related items associated with a category of the card. Examples of the content related items include the applications in the APP card, contacts in the CONTACT card, note inputting dialog, notes, reminders and so on in the NOTE card, pictures, videos, various messages and so on in the RECENT card, various documents in the DOCUMENT card, as illustrated in FIG. 2. It should be appreciated that the content related items and the categories of the cards are not limited to those as illustrated.

At step 1220, a user input is received. The user input indicates switching from presentation of a card to presentation of a page. Examples of the user input may be an operation on the "pin to desktop" button in the menu of the card, and may be a certain gesture performed on the card such as a swipe to right operation in the card movable state. The user input may be received via an input unit such as a touching screen of the displayer.

At step 1230, the page may be presented in response to the user input. The page comprises content related items associated with a category of the page. The card is of the same category as the page and comprises a subset of the content related items of the page.

In an implementation, a content related item of the page provides one or more functions, and a corresponding content related item of the card provides a subset of the functions of the content related item of the page. It should be noted that the subset refers to a part or all of a set.

In an implementation, the content related items in the card and the content related items in the page are ordered based on at least one of operation frequency, operation time, operation preference, wall time, location.

In an implementation, the subset of functions of the content related item of the card is selected or determined out of the functions of the content related item of the page based on at least one of operation frequency, operation time, operation preference, wall time, location.

In an implementation, the category of the card and/or the page comprises at least one of contacts, applications, notes, documents, news, music, video, and recent. Similarly to the categories of cards such as the contacts, applications, notes, documents and recent, other categories of cards and/or pages may also be provided, such as the a card and/or page related to news, a card and/or page related to video, a card and/or page related to music, and so on. Various functions may be provided for the content related items in such cards and corresponding pages.

In an implementation, the card and/or the page having the recent category comprises multiple other categories of content related items. Occurrence of content associated with the multiple other categories may be monitored, and the recently occurred content associated with the multiple other categories may be presented in the RECENT card and/or the RECENT page.

In an implementation, the functions of the content related item of the page and/or the card comprise at least one of the following groups: a first group including at least one of dialing, short messaging, email, and instant messaging; a second group including at least one of opening an application, viewing information of an application, installing an application, and uninstalling an application; a third group including at least one of writing a note, setting an alarm, and setting a ringtone; a fourth group including at least one of Viewing a document, Editing a document and Sharing a document; a fifth group including at least one of adding a label of a news, commenting on a news, rating on a news, and collecting to favorite; a sixth group including at least one of playing a media such as music and/or video, downloading a media, commenting on a media, rating on a media, collecting to favorite.

In an implementation, the UI is a multi-screen UI, the at least one card is presented at a first screen which is one-swipe away from a home screen in the UI, the page is presented at a second screen in the UI. The first screen, the home screen and the second screen are presented alternatively in response to operations such as swipe operations to the screens.

In an implementation, various operations to a page may be performed in response to a user input performed to the page. The presentation of the page is switched to the presentation of the card in response to a user input performed to the page. The presentation of the page is removed from the UI of the launcher in response to a user input performed to the page. The presentation of page is moved from its position to another position among pages or screens in response to a user input performed to the page.

In an implementation, various operations to a card may be performed in response to a user input performed to the card. The card may be removed from the UI of the launcher in response to a user input performed to the card. Both the card and the page may be removed from the UI of the launcher in response to a user input performed to the card. The card may be moved from its position to another position among cards in the UI of the launcher. The card may be folded or unfolded in response to a user input performed to the card.

Figure 13:
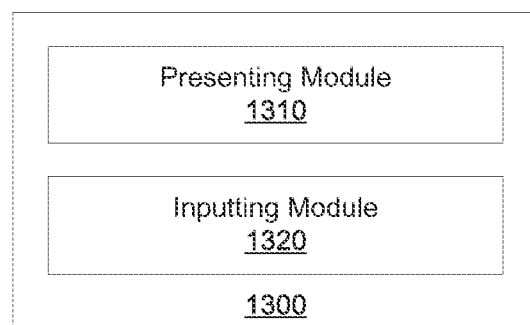
FIG. 13 illustrates an exemplary apparatus for interaction according to an embodiment.

FIG. 13 illustrates an exemplary apparatus 1300 for interaction according to an embodiment.

The apparatus 1300 comprises a presenting module 1310 and an inputting module 1320. The presenting module 1310 is configured to present at least one card in a UI of a launcher. Each of the at least one card comprises content related items associated with a category of the card. The inputting module 1320 is configured to receive a user input indicating switching from presentation of a card to presentation of a page. The presenting module is further configured to present the page in response to the user input. The page comprises content related items associated with a category of the page, the card is of the same category as the page and comprises a subset of the content related items of the page.

The apparatus 1000 may also comprise any other modules configured for performing any operations of the methods for providing contents according to the various embodiments as mentioned above.

Figure 14:
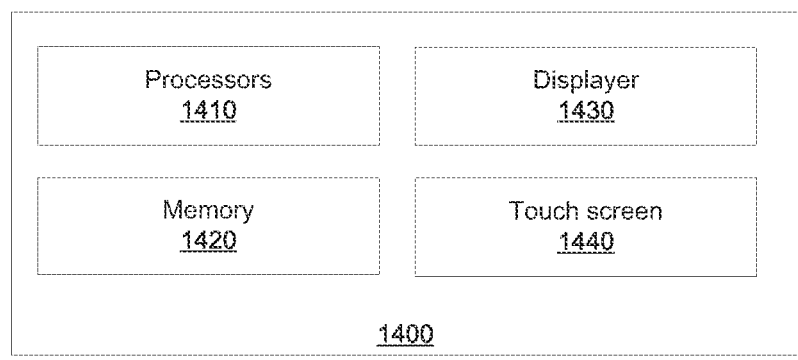
FIG. 14 illustrates an exemplary computing system according to an embodiment.

FIG. 14 illustrates an exemplary system 1400 for interaction according to an embodiment.

The system 1400 may comprise one or more processors 1410. The system 1400 may further comprise a memory 1420 that is connected with the one or more processors 1410. The memory 1420 may store computer-executable instructions that, when executed, cause the one or more processors 1410 to run a desktop launcher. The system 1400 may further comprise a displayer 1430 for displaying a UI of the desktop launcher, the UI includes at least one card, each of the at least one card comprises content related items associated with a category of the card. The system 1400 may further comprise an input unit 1440 for receiving a user input via the UI. The input unit 1440 is illustrated as a touch screen 1440 in FIG. 14. It should be appreciated that any input unit may be applicable in the disclosure, for example, a cursor control device, a camera supporting a NUI, and so on. Although the touch screen 1440 is illustrated as a separate unit from the displayer, it's also possible to integrate the touch screen 1440 in the displayer 1430.

The computer-executable instructions, when executed, further cause the one or more processors 1410 to present a page in response to a user input indicating switching from presentation of a card to presentation of the page. The page comprises content related items associated with a category of the page, the card is of the same category as the page and comprises a subset of the content related items of the page.

The computer-executable instructions, when executed, cause the one or more processors 1410 to perform any operations of the methods for presenting contents according to the embodiments as mentioned above.

The embodiments of the present disclosure may be embodied in a non-transitory computer-readable medium. The non-transitory computer-readable medium may comprise instructions that, when executed, cause one or more processors to perform any operations of the methods for providing content according to the embodiments as mentioned above.

It should be appreciated that all the operations in the methods described above are merely exemplary, and the present disclosure is not limited to any operations in the methods or sequence orders of these operations, and should cover all other equivalents under the same or similar concepts.

It should also be appreciated that all the modules in the apparatuses described above may be implemented in various approaches. These modules may be implemented as hardware, software, or a combination thereof. Moreover, any of these modules may be further functionally divided into sub-modules or combined together.

Processors have been described in connection with various apparatuses and methods. These processors may be implemented using electronic hardware, computer software, or any combination thereof. Whether such processors are implemented as hardware or software will depend upon the particular application and overall design constraints imposed on the system. By way of example, a processor, any portion of a processor, or any combination of processors presented in the present disclosure may be implemented with a microprocessor, microcontroller, digital signal processor (DSP), a field-programmable gate array (FPGA), a programmable logic device (PLD), a state machine, gated logic, discrete hardware circuits, and other suitable processing components configured to perform the various functions described throughout the present disclosure. The functionality of a processor, any portion of a processor, or any combination of processors presented in the present disclosure may be implemented with software being executed by a microprocessor, microcontroller, DSP, or other suitable platform.

Software shall be construed broadly to mean instructions, instruction sets, code, code segments, program code, programs, subprograms, software modules, applications, software applications, software packages, routines, subroutines, objects, threads of execution, procedures, functions, etc. The software may reside on a computer-readable medium. A computer-readable medium may include, by way of example, memory such as a magnetic storage device (e.g., hard disk, floppy disk, magnetic strip), an optical disk, a smart card, a flash memory device, random access memory (RAM), read only memory (ROM), programmable ROM (PROM), erasable PROM (EPROM), electrically erasable PROM (EEPROM), a register, or a removable disk. Although memory is shown separate from the processors in the various aspects presented throughout the present disclosure, the memory may be internal to the processors (e.g., cache or register).

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein. All structural and functional equivalents to the elements of the various aspects described throughout the present disclosure that are known or later come to be known to those of ordinary skill in the art are expressly incorporated herein by reference and are intended to be encompassed by the claims.

The invention claimed is:

1. A method for interaction, comprising:
   presenting at least one card in a user interface (UI) of a launcher, each of the at least one card comprises content related items associated with a category of the card;
   receiving a user input indicating switching from presentation of the card to presentation of a page; and
   presenting the page in response to the user input, wherein the page comprises content related items associated with a category of the page, the card is of the same category as the page and comprises a subset of the content related items of the page, wherein the launcher is a multi-screen UI, the at least one card is presented as a separate page at a first screen which is one-swipe away from a home screen in the UI, the page is newly presented at a second screen in the UI that is at least one swipe away from the first screen and at least one swipe away from the home screen.

2. The method of claim 1, wherein a content related item of the page provides one or more functions, and a corresponding content related item of the card provides a subset of the functions of the content related item of the page.

3. The method of claim 2, wherein the subset of functions of the content related item of the card is selected from the functions of the content related item of the page based on at least one of operation frequency, operation time, operation preference, wall time, location.

4. The method of claim 2, wherein the functions of the content related item of the page and/or the card comprise at least one of the following groups:
   a first group including at least one of dialing, short messaging, email, and instant messaging;
   a second group including at least one of opening an application, viewing information of an application, installing an application, and uninstalling an application;
   a third group including at least one of writing a note, setting an alarm, and setting a ringtone;
   a fourth group including at least one of Viewing a document, Editing a document, and Sharing a document;
   a fifth group including at least one of adding a label of a news, commenting on a news, rating on a news, and collecting a news to favorite; and
   a sixth group including at least one of playing a media, downloading a media, commenting on a media, rating on a media, and collecting a media to favorite.

5. The method of claim 1, wherein the content related items in the card and the content related items in the page are ordered based on at least one of operation frequency, operation time, operation preference, wall time, location.

6. The method of claim 1, wherein the category of the card and/or the page comprises at least one of contacts, applications, notes, documents, news, music, video, and recent.

7. The method of claim 6, wherein the card and/or the page having the recent category comprises multiple other categories of content related items,
   the method further comprises monitoring occurrence of content associated with the multiple other categories, and presenting the recently occurred content associated with the multiple other categories in the card and/or the page.

8. The method of claim 1, further comprising, in response to a user input performed to the page, performing
   moving the presentation of the page from its position to another position among pages.

9. The method of claim 1, further comprising, in response to a user input performed to the card, performing at least one of:
   removing the presentation of the card from the UI;
   removing the presentation of both the card and the page from the UI;
   moving the presentation of the card from its position to another position among cards; and
   folding or unfolding the card.

10. A computing system, comprising:
   one or more processors for executing machine-executable instructions to run a launcher;
   a displayer for displaying a user interface (UI) of the launcher, the UI includes at least one card, each of the at least one card comprises content related items associated with a category of the card; and
   an input unit for receiving a user input via the UI;

the one or more processors are further for executing machine-executable instructions to present a page in response to a user input indicating switching from presentation of the card to presentation of the page, wherein the page comprises content related items associated with a category of the page, the card is of the same category as the page and comprises a subset of the content related items of the page, wherein launcher is a multi-screen UI, the at least one card is presented as a separate page at a first screen which is one-swipe away from a home screen in the UI, the page is presented at a second screen in the UI that is one swipe away from the first screen or the home screen.

11. The computing system of claim 10, wherein a content related item of the page provides one or more functions, and a corresponding content related item of the card provides a subset of the functions of the content related item of the page.

12. The computing system of claim 11, wherein the subset of functions of the content related item of the card is selected from the functions of the content related item of the page based on at least one of operation frequency, operation time, operation preference, wall time, location.

13. The computing system of claim 11, wherein the functions of the content related item of the page and/or the card comprise at least one of the following groups:
   a first group including at least one of dialing, short messaging, email, and instant messaging;
   a second group including at least one of opening an application, viewing information of an application, installing an application, and uninstailing an application;
   a third group including at least one of writing a note, setting an alarm, and setting a ringtone;
   a fourth group including at least one of Viewing a document, Editing a document and Sharing a document;
   a fifth group including at least one of adding a label of a news, commenting on a news, rating on a news, and collecting a news to favorite; and
   a sixth group including at least one of playing a media, downloading a media, commenting on a media, rating on a media, collecting a media to favorite.

14. The computing system of claim 10, wherein the content related items in the card and/or the page are ordered based on at least one of operation frequency, operation time, operation preference, wall time, location.

15. The computing system of claim 10, wherein
   the UI is a multi-screen UI, the at least on card is presented at a first screen which is one-swipe away from a home screen in the UI, the page is presented at a second screen in the UI.

16. The computing system of claim 10, the one or more processors are further for executing machine-executable instructions to, in response to an operation performed to the page, perform at least one of:
   switching the presentation of the page to the presentation of the card;
   removing the presentation of the page from the UI; and
   moving the presentation of page from its position to another position among pages.

17. The computing system of claim 10, the one or more processors are further for executing machine-executable instructions to, in response to an operation performed to the card, perform at least one of:
   removing the presentation of the card from the UT;

removing the presentation of both the card and the page from the UI;

moving the presentation of the card from its position to another position among cards; and folding or unfolding the card.

18. An apparatus for interaction, comprising:

a presenting module for presenting at least one card in a UI of a launcher, each of the at least one card comprises content related items associated with a category of the card; and an inputting module for receiving a user input indicating switching from presentation of the card to presentation of a page; and the presenting module is further for presenting the page in response to the user input, wherein the page comprises content related items associated with a category of the page, the card is of the same category as the page and comprises a subset of the content related items of the page, wherein the launcher is a multi-screen UI, the at least one card is presented as a separate page at a first screen which is one-swipe away from a home screen in the UI, the page is presented at a second screen in the UI that is one swipe away from the first screen or the home screen.

19. The apparatus of claim 18, wherein a content related item of the page provides one or more functions, and a corresponding content related item of the card provides a subset of the functions of the content related item of the page.

\* \* \* \* \*